United States Patent
Blondeau et al.

(10) Patent No.: US 11,694,340 B2
(45) Date of Patent: Jul. 4, 2023

(54) METHOD AND SYSTEM FOR DISPLAYING AN INSTANT IMAGE OF THE FINISH OF A RACE FROM A TEMPORAL IMAGE OF THE PHOTO FINISH TYPE

(71) Applicant: Swiss Timing Ltd., Corgémont (CH)

(72) Inventors: Fabien Blondeau, Chézard-St-Martin (CH); Pascal Richard, Corgémont (CH)

(73) Assignee: SWISS TIMING LTD, Corgemont (CH)

(*) Notice: Subject to any disclaimer, the term of this patent is extended or adjusted under 35 U.S.C. 154(b) by 215 days.

(21) Appl. No.: 16/702,149

(22) Filed: Dec. 3, 2019

(65) Prior Publication Data
US 2020/0193616 A1 Jun. 18, 2020

(30) Foreign Application Priority Data
Dec. 12, 2018 (EP) .................................... 18212068

(51) Int. Cl.
*G06T 7/20* (2017.01)
*G07C 1/24* (2006.01)
*H04N 7/18* (2006.01)

(52) U.S. Cl.
CPC .................. *G06T 7/20* (2013.01); *G07C 1/24* (2013.01); *H04N 7/188* (2013.01); *G06T 2207/30221* (2013.01)

(58) Field of Classification Search
CPC ............ G07C 1/22; G06T 2207/30221; G06T 2207/30228; G06T 7/20; G06T 2207/10;
(Continued)

(56) References Cited

U.S. PATENT DOCUMENTS

| 5,493,331 A | * | 2/1996 | Takahashi | G07C 1/24 348/157 |
| 5,657,077 A | * | 8/1997 | DeAngelis | G07C 1/24 348/157 |

(Continued)

FOREIGN PATENT DOCUMENTS

| JP | 05-300423 A | 11/1993 |
| JP | 5653395 B2 | 1/2015 |
| WO | 2015/168058 A1 | 11/2015 |

OTHER PUBLICATIONS

Nunes et al. "What Did I Miss? Visualizing the Past through Video Traces", Sep. 2007, Springer, Proceedings of the Tenth European Conference on Computer Supported Cooperative Work, p. 1-20. (Year: 2007).*

(Continued)

*Primary Examiner* — Vincent Rudolph
*Assistant Examiner* — Timothy Choi
(74) *Attorney, Agent, or Firm* — Sughrue Mion, PLLC (57) ABSTRACT

A display method including the steps of: acquiring, at a first predetermined frequency, a first series of one-spatial-dimensional instant images of the finish line of a race; simultaneously acquiring a second series of two spatial-dimensional instant images of the same finish line (19) at a second predetermined frequency; forming a temporal image (10) of the photo finish type from the first series of instant images; choosing an instant (15, 22) of the temporal image (10); analysing a two-spatial-dimensional image of the second series, the image being correlated with the selected instant (15, 22) to determine at least one distance; and displaying the analysed two-dimensional image with the determined distance or distances. Also, a display system for implementing the method.

18 Claims, 4 Drawing Sheets

(58) Field of Classification Search
CPC . G06T 2207/10004; G06T 2207/10016; G06T 2207/20092; G06T 2207/20101; G06T 2207/20104; G06T 2207/20108; H04N 7/188; G06K 9/00711; G06K 9/00744
See application file for complete search history.

(56) References Cited

U.S. PATENT DOCUMENTS

| | | | |
|---|---|---|---|
| 2001/0048754 A1* | 12/2001 | Antonio | A63B 24/0021 |
| | | | 382/106 |
| 2005/0285877 A1* | 12/2005 | Dengler | G06T 7/97 |
| | | | 345/632 |
| 2007/0002039 A1* | 1/2007 | Pendleton | G06T 7/536 |
| | | | 345/419 |
| 2011/0317009 A1* | 12/2011 | Kumaraswamy | G06V 20/46 |
| | | | 382/173 |
| 2014/0204206 A1 | 7/2014 | Itoi et al. | |
| 2015/0312493 A1* | 10/2015 | Aldridge | H04N 5/2355 |
| | | | 348/157 |

OTHER PUBLICATIONS

Zhao et al., "An Automatic Timing Method for Photo Finish", Apr. 2013, IEEE, The 8th International Conference on Computer Science & Education (ICCSE 2013), p. 902-906. (Year: 2013).*

European Search Report for EP 18 21 2068 dated May 17, 2019.

* cited by examiner

METHOD AND SYSTEM FOR DISPLAYING AN INSTANT IMAGE OF THE FINISH OF A RACE FROM A TEMPORAL IMAGE OF THE PHOTO FINISH TYPE

CROSS REFERENCE TO RELATED APPLICATIONS

This application claims priority to European Patent Application No. 18212068.3 filed on Dec. 12, 2018, the entire contents of which are incorporated herein by reference.

FIELD OF THE INVENTION

The invention concerns a method for displaying an instant image of the finish of a race, particularly of a sports discipline, from a temporal image of the photo finish type.

The invention also concerns a system for displaying an instant image of the finish of a race, particularly of a sports discipline, from a temporal image of the photo finish type, for implementation of the method.

BACKGROUND OF THE INVENTION

In a racing sport competition, such as an athletics sprint, cycling, cross-country ski or speed skating race, or during an equestrian event, the use of images to rank the competitors is well known, in particular to decide between them when they are very close. These images are usually called 'photo finish' images. They have the peculiarity of having a spatial dimension along the finish line on the ordinate of the image and a temporal dimension on the abscissa of the image. Thus, each vertical section of the image represents the finish line at a given instant. By means of this temporal dimension, it is possible to define the order in which the competitors reached the finish line. The moment at which a competitor reaches the finish line is determined according to a part of the athlete's body or equipment. Requirements are different in different sports. For example, in an athletics sprint race, the moment is defined once part of the athlete's chest crosses the finish line. For a speed skating or cross-country ski race, the moment is defined when the skate or foot reaches the finish line. Since competitors often finish in groups, photo finish images require high precision.

To form these images, there is used a photographic system provided with a camera capable of taking a large number of images of the finish line per second, for example at a rate of one thousand to ten thousand images per second Generally, the images taken by the camera are centred on the finish line. In other words, the images taken by the camera are vertical sections of the finish line, the sections having, for example, a width of one pixel. To obtain the photo finish image, the vertical sections are juxtaposed one after the other in the chronological order of shooting. Thus, an image is obtained of the finish line as a function of time.

However, photo finish images cannot determine the differences in distance between the competitors at a given instant. Indeed, the competitors only appear in the image as they reach the finish line, such that it is not possible to determine or display the distances between competitors at a given instant. In a photo finish image, the space between the competitors represents a temporal difference and not a spatial distance. Thus, when the first competitor crosses the line or when two competitors are very close at the finish, it is desirable to know the spatial distance between the first and subsequent competitor(s).

SUMMARY OF THE INVENTION

It is therefore an object of the invention to overcome the drawbacks of the aforementioned state of the art by proposing a method capable of acquiring images showing distances between competitors at the finish of a race, the images being correlated with a photo finish image.

To this end, the invention concerns a method for displaying an instant image of the finish of a race, particularly of a sports discipline, from a temporal image of the photo finish type of the same finish, the method being implemented by a display system comprising at least one video camera and a display device.

The method is characterized in that it includes the following steps:
- acquiring, at a first predetermined frequency, a first series of one-spatial-dimensional instant images of the finish line of a race, the spatial dimension being substantially directed along the finish line,
- simultaneously acquiring a second series of two-spatial-dimensional instant images of the same finish line at a second predetermined frequency, the first spatial dimension being directed along the finish line and the second spatial dimension being directed in the direction of the race,
- forming a temporal image of the photo finish type from the first series of instant images, the images being juxtaposed in the order of acquisition, such that the abscissa of the temporal image represents a temporal dimension, each point of the abscissa corresponding to a given instant at the finish line,
- choosing an instant of the temporal image,
- analysing a two-spatial-dimensional image of the second series, the image being correlated with the selected instant to determine at least one distance, and
- displaying the analysed two-dimensional image with the determined distance or distances.

Particular embodiments of the method are defined in the dependent claims 2 to 12.

By means of this method, it is possible to display a two-dimensional image from a photo finish image, by selecting an instant on the general photo finish image. Indeed, the instants of the photo finish image are correlated with a spatial image of the finish line, such that it is possible to make the connection between these instants and an image showing the gaps between competitors.

Further, using image processing software, it is possible to determine the distances between competitors on the two-dimensional images. It is also possible to calculate the distances of the gaps between the competitors and make them appear on the displayed image.

For example, the spatial image representing the distances between the competitors can be displayed by selecting an instant on the photo finish image.

This method has the advantage, for example, of helping spectators who are watching the race on a screen, to envisage the gap between the competitors or the gap between the finish line and one or more competitors.

According to a preferred embodiment of the invention, the temporal photo finish image is displayed in order to choose the instant.

According to a preferred embodiment of the invention, an acquisition time is measured during the acquisition of the two series of images, and a time is attributed to each image of both series.

According to a preferred embodiment of the invention, a step of temporal correlation of the two series of images is performed so that each two-dimensional image of the second series of images is correlated with the temporally closest one-dimensional image of the first series.

According to a preferred embodiment of the invention, an image of the second series is correlated with a single image of the first series which is temporally closest.

According to a preferred embodiment of the invention, each image of the first series is correlated with a different image of the second series, such that each instant of the temporal photo finish image is correlated with a two-dimensional image of the second series of images.

According to a preferred embodiment of the invention, the second spatial dimension is directed perpendicularly to the first dimension.

According to a preferred embodiment of the invention, the instant is chosen by selecting a point on the temporal photo finish image, the selected two-dimensional image being correlated with the abscissa of the chosen point in the temporal image.

According to a preferred embodiment of the invention, the first and second frequencies are equal.

According to a preferred embodiment of the invention, the two-dimensional image is analysed to determine a distance between two or more competitors.

According to a particular technical feature of the invention, the two-dimensional image is analysed to determine a distance between the finish line and one or more competitors.

According to a particular technical feature of the invention, the first frequency is comprised within a range of 500 to 30,000 images per second.

According to a particular technical feature of the invention, the second frequency is comprised within a range of 50 to 5,000 images per second.

The invention also concerns a system for displaying an instant image of the finish of a race, particularly of a sports discipline, from a temporal photo finish image of the same finish.

To this end, the system includes:
- an acquisition unit for acquiring at a first predetermined frequency, a first series of one-spatial-dimensional instant images of the finish line of a race, the spatial dimension being directed along the finish line, the acquisition unit also being configured to simultaneously acquire a second series of two-spatial-dimensional instant images of the same finish line at a second predetermined frequency, the first spatial dimension being directed along the finish line and the second spatial dimension being directed in the direction of the race,
- a control unit configured to form a temporal photo finish image from the first series of instant images, the images being juxtaposed in the order of acquisition, such that the abscissa of the temporal image represents a temporal dimension, each point of the abscissa corresponding to a given instant at the finish line, the control unit being also configured to analyse a two-spatial-dimensional image of the second series, the image being correlated with the selected instant to determine at least one distance,
- a display unit for displaying the two-dimensional image analysed with the determined distance or distances.

Particular embodiments of the method are defined in the dependent claims 13 to 16.

According to a particular embodiment of the invention, the control unit includes a unit for measuring the acquisition time during which the two series of images are acquired, the control unit being configured to attribute an acquisition time to each image of both series of images, and to temporally correlate the two series of images such that each two-dimensional image of the second series of images is correlated with a one-dimensional image of the first series which is temporally closest.

According to a particular embodiment of the invention, the acquisition unit includes a first camera configured to acquire the first series of images, and a second camera configured to acquire the second series of images, the two cameras being oriented along the axis of the finish line.

According to a particular embodiment of the invention, the display unit includes a screen.

BRIEF DESCRIPTION OF THE DRAWINGS

The objects, advantages and features of the display method and system according to the invention will appear more clearly in the following description of at least one non-limiting embodiment illustrated by the drawings, in which.

DETAILED DESCRIPTION OF THE INVENTION

According to the invention, the method is arranged to allow correlation between a temporal photo finish image and two-dimensional images by means of which gaps in distance can be calculated at the finish of a race, for example between competitors or between one or more competitors and the finish line. The method described above concerns, for example, an athletics, cross-country ski, speed skating or cycling race, or an equestrian event. The method is implemented by a video acquisition and display system comprising at least one video camera and a display device.

Figure 1:
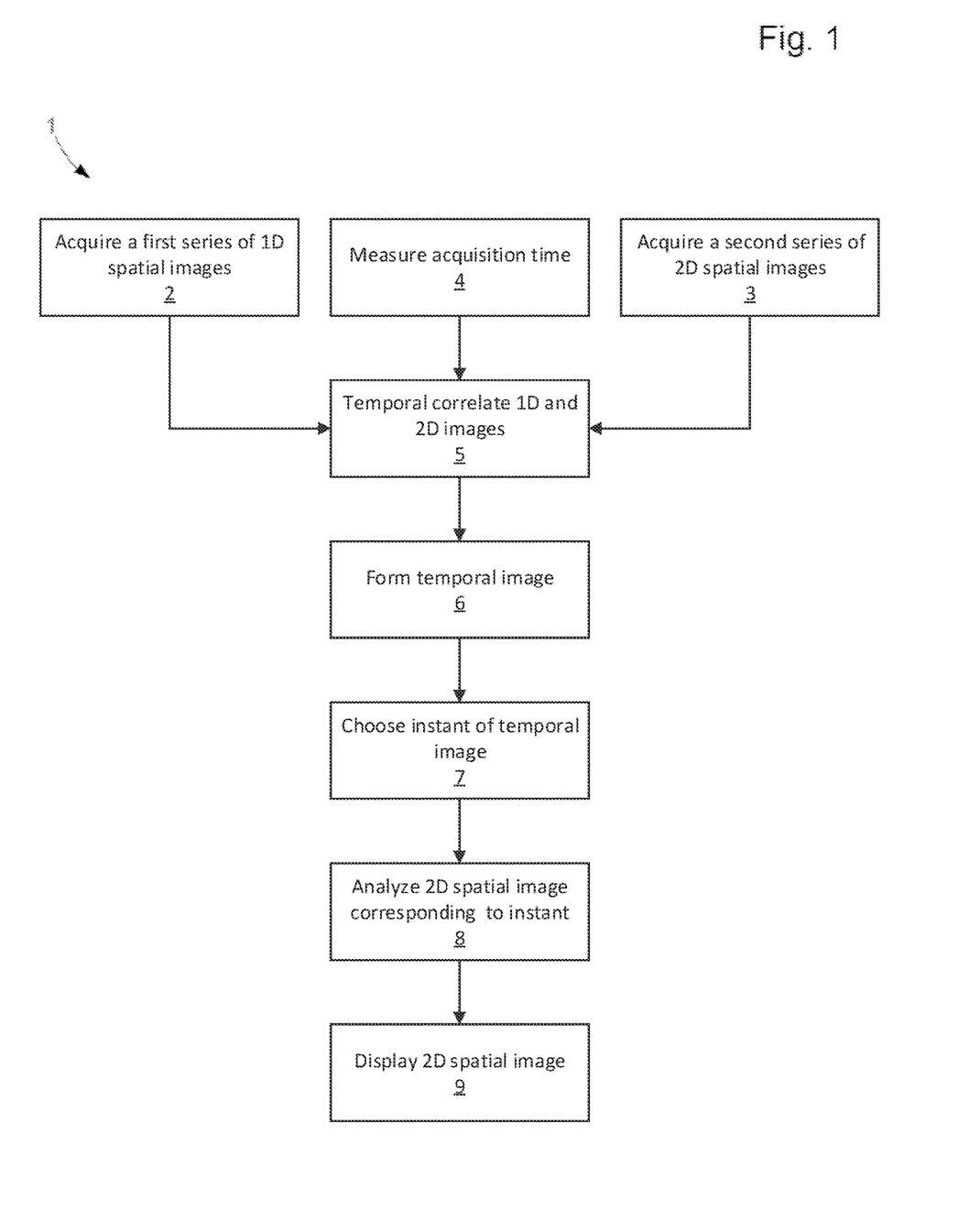
FIG. 1 is a synoptic diagram of a display method according to the invention.

In FIG. 1, method 1 according to the invention is a method for displaying an instant image of the finish of a race, particularly of a sports discipline, from a temporal photo finish image of the same finish line.

The method includes a first step consisting in acquiring 2 a first series of one spatial-dimensional instant images of the finish line of a race at a first predetermined frequency, the spatial dimension being directed along the finish line. Current photo finish cameras can provide, for example, a first frequency comprised within a range of 500 to 30,000 images per second.

Simultaneously, in a second step, the method consists in acquiring 3 a second series of two-spatial-dimensional instant images of the same finish line at a second predetermined frequency. In the image, the first spatial dimension is directed along the finish line and the second spatial dimension is directed in the direction of the race. Preferably, the second spatial dimension is directed perpendicularly to the first dimension. Current two-dimensional cameras can provide, for example, a second frequency comprised within a range of 50 to 5,000 images per second.

Also simultaneously, in a third step, an acquisition time is measured 4 during the acquisition of the two series of images. For example, this time is measured by means of the acquisition frequencies of the two series of images. Thus, a time is attributed to each image of the two series. Consequently, the images can be ranked chronologically according to the moment that they were acquired.

The fourth step then consists in temporal correlation 5 of the two series of images so that a two-dimensional image of the second series of images corresponds to a one-dimensional image of the first series. In other words, depending on the time that is attributed to each image, a temporal connection is made between the images of the first series and those of the second series. On the one hand, the images are organised in relation to each other within each series, and on the other hand, the images are correlated between the series. Correlation is performed by selecting an image of the second series which is temporally closest to the image of the first series.

When the first frequency is higher than the second frequency, there are fewer two-dimensional images than one-dimensional images. In such case, there may be several one-dimensional images that are correlated with one two-dimensional image.

According to a particular embodiment, the first and second frequencies are equal in order to obtain as many two-dimensional images of the second series as one-dimensional images of the first series. Thus, each image of the first series is correlated with an image of the second series. In this embodiment, the common frequency is chosen in accordance with the acquisition capacity of the cameras for the two types of images, especially for the two-dimensional images.

The function of the fifth step is to form 6 a temporal image of the photo finish type from the first series of instant images. To this end, the images are juxtaposed in the order of acquisition one after the other. Thus, the abscissa of the temporal image represents a temporal dimension. Each point of the abscissa of the temporal image corresponds to a given instant at the finish line. As a result of correlation, each instant of the temporal photo finish image is consequently correlated with a two-dimensional image of the second series.

In a sixth step 7, an instant of the temporal image is chosen. In a preferred embodiment, the temporal photo finish image is displayed 7 to choose the instant. A point on the photo finish image is chosen for this purpose. The abscissa of this point gives the corresponding instant, which makes it possible to select the two-dimensional image, correlated with the abscissa of the selected point. For example, the instant when the first competitor reaches the finish line is chosen, to establish the gap in distance with the second competitor or with several subsequent competitors.

After selecting the image from the second series, in a seventh step, the image is analysed 8 to determine at least the desired distance. Using image analysis software, it is possible to determine this distance. The two-dimensional image is analysed to determine a distance between the finish line and one or more competitors. This software is preferably calibrated prior to the race to be capable of calculating distances from two-dimensional images.

The eighth step consists in displaying 9 the selected and analysed two-dimensional image, by displaying the determined distance or distances on the image. The image is, for example, displayed on a television screen to show the spatial distance between the first competitor and the subsequent competitors. It is possible to simultaneously show the temporal photo finish image to show the order of finish of the competitors.

By means of the method, it is easy to calculate and display an image showing a gap in distance from a temporal photo finish image.

Figure 2:
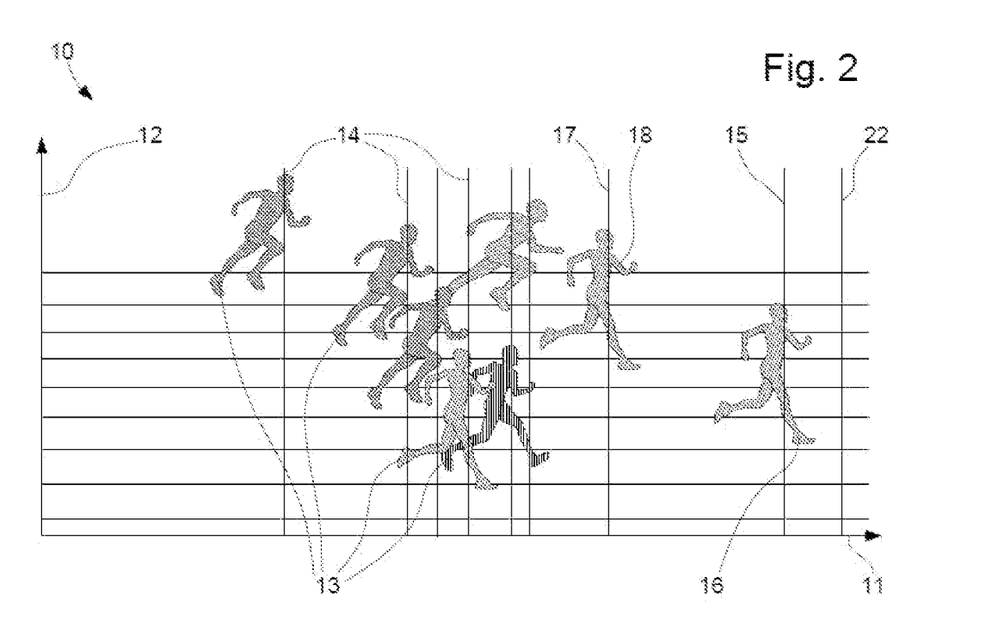
FIG. 2 is a schematic representation of a temporal image of the photo finish type of the finish of an athletics race.

FIG. 2 shows a temporal photo finish image 10 obtained from a first series of one-dimensional images of the finish line according to the method. It is called a 'temporal' image because abscissa 11 of the image represents the time that elapses on the finish line. Abscissa 11 of temporal image 10 consequently represents a temporal dimension, whereas the ordinate 12 represents a spatial dimension of the finish line. Each point of abscissa 11 of the temporal image corresponds to a given instant at the finish line. Thus, instants 14 when runners 13 reach the finish line can be observed. Indeed, each runner 13 appearing in the photo is represented at instant 14 when he reaches the finish line of the race. These instants are determined by lines perpendicular to ordinate 11 and passing through runners 13. Thus, the gap between two runners 13 on abscissa 11 of image 10 is a temporal gap and not a spatial distance.

According to the method described above, a first instant 15 of image 10 is for example chosen. First instant 15 corresponds to the moment when the first runner 15 crosses the finish line. In this example, it is desired to display the distance between the first and second runner in the correlated image of the second series correlated with this instant 15.

Figure 3:
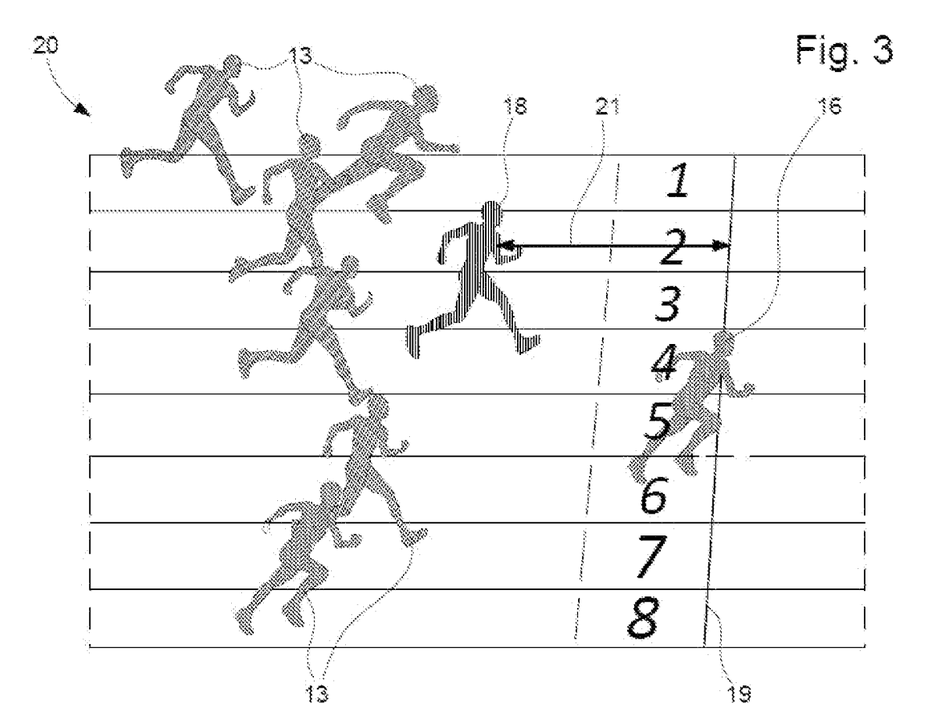
FIG. 3 is a schematic representation of a first two-dimensional image correlated with a first instant of the temporal image.

FIG. 3 shows the image of the second series correlated with the first instant chosen in temporal image 10 of FIG. 2. Instant image 20 shows the finish of runners 13, particularly the first runner 16, on the finish line 19, followed by the second runner 18. By means of image 20, it is possible to analyse and calculate the distance 21 between the first 16 and second 18 runner at this instant of the race. Pre-calibrated image analysis software measures the distance 21 between the two runners, which here is 2.23 m. This image 20 is then displayed with the result of the measurement to show the spatial distance 21 between runners 16, 18. Distance 21 is represented by a double arrow in the Figure.

Figure 4:
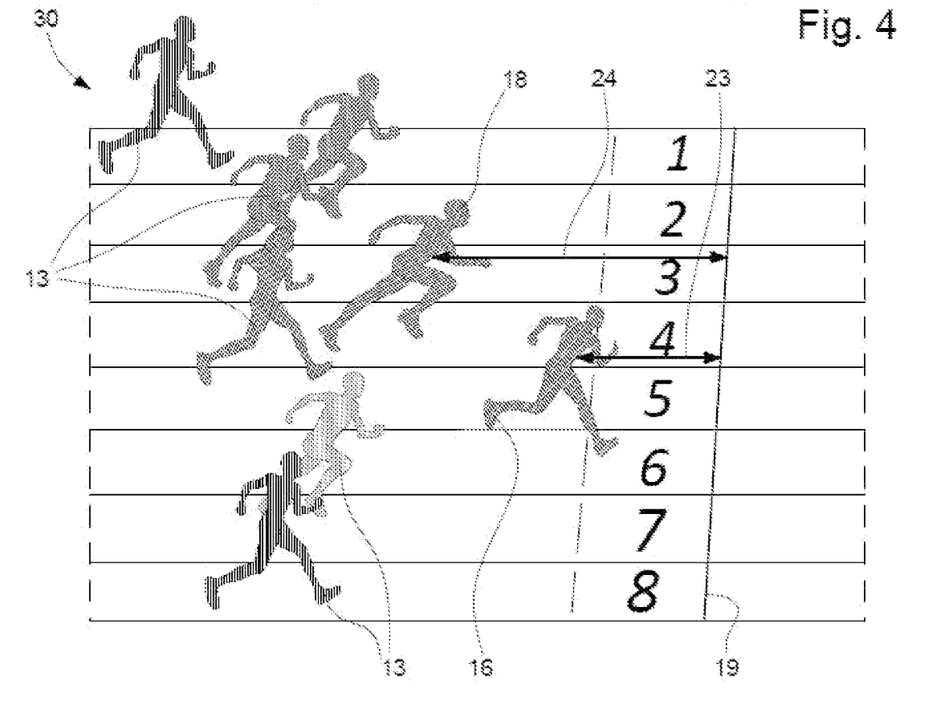
FIG. 4 is a schematic representation of a second two-dimensional image correlated with a second instant of the temporal image.

If, for example, a second instant 22 of temporal image 10 of FIG. 2 is chosen, the correlated two-dimensional image 30 of FIG. 4 will be obtained. In this example, the second instant is chosen shortly before first runner 16 reaches finish line 21. The distances are calculated between the first two runners 16, 18 and finish line 19. The first runner is 0.97 m from the finish line, whereas the second runner is 3.31 m from the finish line. This image 30 is then displayed with the distances shown according to the method described above.

The invention also relates to a system for displaying an instant image of the finish of a race, particularly of a sports discipline, the instant image showing at least one gap in distance. The system is, in particular, suitable for implementing the method described above. The system makes it possible to correlate a photo finish image with two-dimensional images. Further, it makes it possible to select a two-dimensional image from the temporal photo finish image.

Figure 5:
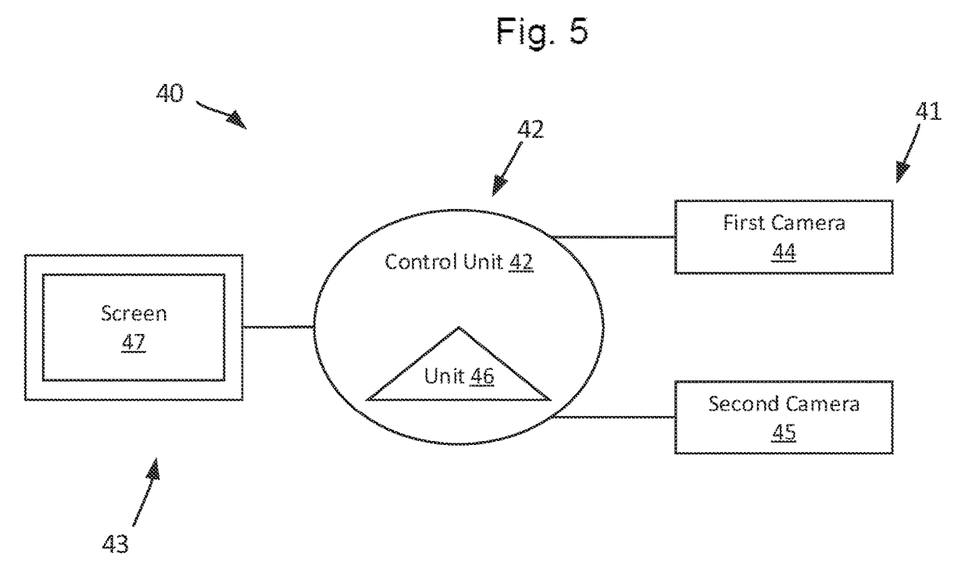
FIG. 5 is a schematic representation of a display system according to the invention.

In FIG. 5, system 40 comprises an acquisition unit 41, a control unit 42, and a display unit 43.

In a preferred embodiment, acquisition unit 41 includes a first camera 44 configured to acquire a first series of images at a first predetermined frequency, and a second camera 45 configured to acquire a second series of images at a second predetermined frequency. The two cameras 44 and 45 are oriented along the axis of the finish line, to obtain images of the finish of the race.

The first camera 44 is configured to take one-spatial-dimensional instant images of the finish line of a race, the spatial dimension being directed along the finish line, This type of camera is commonly used to form photo finish images. First camera 44 has, for example, a first frequency comprised within a range of 500 to 30,000 images per second. First camera 44 transmits the one-dimensional images of the first series to control unit 42 so that it forms a temporal photo finish image.

Second camera 45 is configured to acquire a second series of two-spatial-dimensional instant images of the same finish line. The first spatial dimension is directed along the finish line and the second spatial dimension is directed in the direction of the race. Second camera 45 transmits the two-dimensional images to control unit 42. Second camera 45 has, for example, a second frequency comprised within a range of 50 to 30,000 images per second.

Control unit 42 includes a unit 46 for measuring the acquisition time during which the two series of images are acquired. The first and second series are simultaneously acquired, in particular at the finish of the race. By means of time measurement unit 46, control unit 42 is configured to attribute an acquisition time to each image of the two series of images according to the method. Further, control unit 42 defines the image acquisition frequencies of cameras 44, 45. Control unit 42 transmits the frequencies to cameras 44, 45, the frequencies being chosen in accordance with the acquisition capacity of each camera 44, 45.

Attributing an acquisition time to each image allows control unit 42 to temporally correlate the two series of images. Thus, a two-dimensional image of the second series of images is correlated with a one-dimensional image of the first series. An image of the first series is correlated with an image of the second series which is temporally closest. Preferably, each image of the first series is correlated with one image of the second series.

Control unit 42 is also configured to form a temporal photo finish image from the first series of instant images. The images are juxtaposed in the order of acquisition, such that the abscissa of the temporal image represents a temporal dimension, each point of the abscissa corresponding to a given instant at the finish line.

Control unit 42 is also configured to analyse a two-spatial-dimensional image of the second series to determine a distance between runners or between the finish line and one or more runners. When an instant is chosen on the temporal image, the control unit analyses the two-dimensional image correlated with this instant. According to various embodiments, the distance required to be calculated is predefined, namely whether it is between runners or between the finish line and one or more runners. The control unit then transmits the analysed image to display unit 43.

Control unit 42 can also have the function of displaying the temporal image to allow a person, for example an umpire/referee/judge or a television producer, to choose the instant and the distance to be calculated. Thus, to choose the instant according to the method, the person clicks at a point on the image displayed on the screen. The abscissa of the point determines the two-dimensional image correlated with that point. Further, the person can also select on the image the distance to be calculated by the image analysis software. To this end, control unit 42 is provided with a screen (not represented in the Figure) accessible to said person.

Display unit 43 includes a screen 47 for displaying the analysed two-dimensional image with the determined distance or distances. Display unit 43 can also comprise means for transmitting the analysed image (not represented in the Figure) to display it on one or more remote screens, in particular in case of retransmission of the sports event, for example on television or on the internet.

Naturally, the invention is not limited to the embodiments described with reference to the Figures and variants could be envisaged without departing from the scope of the invention. In particular, the values of the first and second image acquisition frequencies could be chosen with higher values if allowed by progress in the technical capacities of the two types of camera.

The invention claimed is:

1. A method (1) for displaying an instant image (20, 30) of a finish of a race, particularly of a sports discipline, from a temporal image (10) of a photo finish type of the same finish, the method (1) being implemented by a display system (40) comprising at least one video camera (44, 45) and a display device (43), characterized in that the method includes the following steps
   acquiring (2), at a first predetermined frequency, a first series of one-spatial-dimensional instant images of the finish line (19) of a race, the spatial dimension being substantially directed along the finish line (19),
   simultaneously acquiring (3) a second series of two-spatial-dimensional instant images (20, 30) of the same finish line (19) at a second predetermined frequency, the first spatial dimension being substantially directed along the finish line (19) and the second spatial dimension being substantially directed in the direction of the race,
   forming (6) a temporal image (10) of the photo finish type from the first series of instant images, the images being juxtaposed in the order of acquisition, such that the abscissa (11) of the temporal image (10) represents a temporal dimension, each point of the abscissa (11) corresponding to a given instant at the finish line (19),
   choosing on the temporal image (10) at least one distance (21, 23, 24) to be determined, while the temporal image (10) is displayed,
   choosing (7) an instant (15, 22) of the temporal image (10),
   analysing (8), based on choosing (7) the instant (15, 22) of the temporal image that is formed from the first series of instant images, a two-spatial-dimensional image (20, 30) of the second series, from which the temporal image (10) has not been formed and that is correlated with the chosen instant (15, 22) of the temporal image that is formed from the first series of instant images, to determine the at least one distance (21, 23, 24) that is chosen on the temporal image (10), and
   displaying (9) the analysed two-dimensional image (20, 30) with the determined at least one distance (21, 23, 24).

2. The method (1) according to claim 1, characterized in that the temporal photo finish image (10) is displayed in order to choose the instant (15, 22).

3. The method (1) according to claim 1, characterized in that an acquisition time is measured during the acquisition of the two series of images, and a time is attributed to each image of the two series.

4. The method (1) according to claim 1, further comprising performing temporal correlation (5) of the two series of images is performed so that each two-dimensional image (20, 30) of the second series of images is correlated with the temporally closest one-dimensional image of the first series.

5. The method (1) according to claim 1, characterized in that an image (20, 30) of the second series is correlated with a single image of the first series.

6. The method (1) according to claim 1, characterized in that each image of the first series is correlated with a different image (20, 30) of the second series, such that each instant (15, 22) of the temporal photo finish image (10) is correlated with one two-dimensional image of the second series of images.

7. The method (1) according to claim 1, characterized in that the second spatial dimension is directed perpendicularly to the first dimension.

8. The method (1) according to claim 1, characterized in that the instant (15, 22) is chosen by selecting a point on the temporal photo finish image (10), the selected two-dimensional image being correlated with the abscissa (11) of the chosen point on the temporal image (10).

9. The method (1) according to claim 1, characterized in that the first and second frequencies are equal.

10. The method (1) according to claim 1, characterized in that the two-dimensional image (20, 30) is analysed to determine the distance (21) between two (16, 18) or more competitors.

11. The method (1) according to claim 1, characterized in that the two-dimensional image (20, 30) is analysed to determine the distance (23, 24) between the finish line (19) and one or more competitors (16, 18).

12. The method (1) according to claim 1, characterized in that the first frequency is comprised within a range of 500 to 30,000 images per second, and the second frequency is comprised within a range of 50 to 5,000 images per second.

13. The method (1) according to claim 1, characterized in that the first frequency is different from the second frequency.

14. The method (1) according to claim 1, further comprises displaying a plurality of lines on the temporal image (10), each of the plurality of lines extending in a direction perpendicular to the abscissa (11) and corresponding to a respective instant at which a respective competitor reaches the finish line (19).

15. A system (40) for displaying an instant image (20, 30) of a finish of a race, particularly of a sports discipline, from a temporal image of a photo finish type (10) of the same finish, the system being characterized in that it includes:
a first camera (44) configured to acquire, at a first predetermined frequency, a first series of one-spatial-dimensional instant images of the finish line (19) of a race, the spatial dimension being directed along the finish line;
a second camera (45) configured to simultaneously acquire a second series of two-spatial-dimensional instant images of the same finish line (19) at a second predetermined frequency, the first spatial dimension being directed along the finish line (19) and the second spatial dimension being directed in the direction of the race,
a controller (42) configured to form a temporal image (10) of the photo finish type from the first series of instant images, the images being juxtaposed in the order of acquisition, such that the abscissa of the temporal image represents a temporal dimension, each point of the abscissa (11) corresponding to a given instant at the finish line (19), the controller (42) also being configured to analyse, based on choosing an instant (15, 22) of the temporal image that is formed from the first series of instant images, a two-spatial-dimensional image (20, 30) of the second series, from which the temporal image (10) has not been formed and that is correlated with the chosen instant (15, 22) of the temporal image that is formed from the first series of instant images, to determine at least one distance,
a display (43) configured to display the analysed two-dimensional image (20, 30) with the determined at least one distance (21, 23, 24),
wherein the controller (42) is further configured to allow a user to choose on the temporal image (10) the at least one distance (21, 23, 24) to be determined, while the temporal image (10) is displayed, and determine the at least one distance (21, 23, 24) with respect to the two-spatial-dimensional image (20, 30) of the second series based on the at least one distance (21, 23, 24) chosen by the user on the temporal image (10).

16. The system (40) according to claim 15, characterized in that the controller (42) is configured to measure the acquisition time during which the two series of images are acquired, the controller (42) being configured to attribute an acquisition time to each image of the two series of images, and to temporally correlate the two series of images such that each two-dimensional image (20, 30) of the second series of images is correlated with a one-dimensional image of the first series which is temporally closest.

17. The system (40) according to claim 15, characterized in that the first camera (44) and the second camera (45) are oriented along the axis of the finish line (19).

18. The system (40) according to claim 15, characterized in that the display (43) comprises a screen (47).

* * * * *